(12) United States Patent
Baharis et al.

(10) Patent No.: US 8,752,125 B2
(45) Date of Patent: Jun. 10, 2014

(54) AUTHENTICATION METHOD

(75) Inventors: Chris Baharis, Wantirna (AU); Ross Oakley, Malvern (AU)

(73) Assignee: Salt Group Pty Ltd, Melbourne (AU)

( * ) Notice: Subject to any disclaimer, the term of this patent is extended or adjusted under 35 U.S.C. 154(b) by 1542 days.

(21) Appl. No.: 11/665,719

(22) PCT Filed: Oct. 19, 2005

(86) PCT No.: PCT/AU2005/001618
§ 371 (c)(1),
(2), (4) Date: Apr. 18, 2007

(87) PCT Pub. No.: WO2006/079145
PCT Pub. Date: Aug. 3, 2006

(65) Prior Publication Data
US 2008/0046988 A1    Feb. 21, 2008

(30) Foreign Application Priority Data

Oct. 20, 2004  (AU) ................................ 2004906085

(51) Int. Cl.
*G06F 7/04*       (2006.01)
*G06F 17/30*     (2006.01)

(52) U.S. Cl.
USPC ............................................. 726/2; 713/170

(58) Field of Classification Search
USPC ........................ 705/64, 67; 713/169, 176, 182
See application file for complete search history.

(56) References Cited

U.S. PATENT DOCUMENTS

| | | | | |
|---|---|---|---|---|
| 5,668,876 A | * | 9/1997 | Falk et al. ...................... | 380/271 |
| 7,702,898 B2 | * | 4/2010 | Tan ................................ | 713/150 |
| 7,707,412 B2 | * | 4/2010 | Nyberg et al. ................. | 713/168 |
| 7,827,115 B2 | * | 11/2010 | Weller et al. .................... | 705/78 |
| 8,271,395 B2 | * | 9/2012 | Dominguez et al. ............ | 705/65 |
| 2002/0178385 A1 | | 11/2002 | Dent et al. ..................... | 713/202 |
| 2002/0181710 A1 | * | 12/2002 | Adam et al. ................... | 380/270 |

(Continued)

FOREIGN PATENT DOCUMENTS

| | | |
|---|---|---|
| EP | 1807966 | 7/2007 |
| WO | WO/03/063411 | 7/2003 |
| WO | WO 2004/028071 | 4/2004 |
| WO | WO/2006/079145 | 8/2006 |

OTHER PUBLICATIONS

Supplementary European Search Report issued Jun. 25, 2013 by the European Patent Office for EP Pat. App. 20050856172 which published as EP1807966 on Jul. 18, 2007 and claims priority to International Application PCT/AU2005/001618 filed Oct. 19, 2005 (Inventor—Chris Baharis) (7 pages).

(Continued)

*Primary Examiner* — Kambiz Zand
*Assistant Examiner* — Jing Sims
(74) *Attorney, Agent, or Firm* — Ballard Spahr LLP (57) ABSTRACT

There is disclosed an authentication method comprising requesting a user of a personal mobile terminal to enter a personal code into a personal mobile terminal in response to receipt of an authentication request transmitted to the personal mobile terminal, the authentication request being related to an action that requires user authentication, and processing an entered personal code together with challenge data corresponding to the authentication request to determine whether one or more predetermined conditions are met and, if one or more predetermined conditions are met, producing a valid and signed authentication code that the user can provide in order to authenticate the action.

37 Claims, 4 Drawing Sheets

(56) References Cited

U.S. PATENT DOCUMENTS

| | | | |
|---|---|---|---|
| 2003/0120957 A1 | 6/2003 | Pathiyal | 713/202 |
| 2003/0188160 A1* | 10/2003 | Sunder et al. | 713/165 |
| 2004/0097217 A1 | 5/2004 | McClain | 455/411 |
| 2004/0098715 A1* | 5/2004 | Aghera et al. | 717/173 |
| 2004/0158708 A1 | 8/2004 | Peyravian | 713/156 |
| 2005/0188200 A1* | 8/2005 | Kwok | 713/168 |
| 2006/0165060 A1* | 7/2006 | Dua | 370/352 |

OTHER PUBLICATIONS

International Preliminary Report on Patentability issued Apr. 24, 2007 by the International Bureau of WIPO for International Application PCT/AU2005/001618 filed Oct. 19, 2005 (Inventor—Chris Baharis) (6 pages).

International Search Report issued Dec. 22, 2005 by the International Searching Authority for International Application PCT/AU2005/001618 filed Oct. 19, 2005 (Inventor—Chris Baharis) (2 pages).

Written Opinion issued Dec. 22, 2005 by the International Searching Authority for International Application PCT/AU2005/001618 filed Oct. 19, 2005 (Inventor—Chris Baharis) (5 pages).

Varadharajan, V. Authentication in mobile distributed environment. Mobile and Personal Communication, Dec. 13-15, 1993. Conference Publication No. 387 (1993).

* cited by examiner

AUTHENTICATION METHOD

CROSS REFERENCE TO RELATED APPLICATIONS

The present application is a National Phase Application of International Application No. PCT/AU2005/001618, filed Oct. 19, 2005, which claims priority to Australia Patent Application No. 2004906085 filed Oct. 20, 2004, which application is incorporated herein fully by this reference.

FIELD OF THE INVENTION

The present invention relates to an authentication method that allows a personal mobile terminal to authenticate an action.

BACKGROUND TO THE INVENTION

There are a large number of instances where it would be desirable to provide an improved method for a user to authenticate an action. Currently there is a potential security problem in any system which requires a user to log in to a web server by providing a user name and password. Such systems rely on the password being something that the user alone knows. However, the password can be compromised, for example, by so-called "phishing" where a user is tricked into providing their password to a party that is not entitled to the password by getting the user to visit a bogus website and enter their name and password.

It has recently become more popular to employ "2-factor" security techniques which rely on their being something that the user alone has in their possession as well as something the user alone knows. A typical device which is used in such systems is a token that generates a unique code every 60 seconds thereby creating what is in effect a new secondary password every 60 seconds. To defeat such a security measure the person must either obtain the person's password and their security device or learn the secondary password during the very short period of time where it is valid. Accordingly, such devices provide a higher level of security.

A first problem with such devices is that if the person does not carry out all transactions from the same location they must carry the token with them which can be inconvenient. Further, the tokens are typically configured so that they can only act as a secondary password to one additional system. Thirdly, if the user does not use the device regularly, they can readily misplace the token. Fourthly, the tokens can be difficult to distribute. Fifthly, as specific hardware has to be provided for the secondary password, the cost of such tokens is relatively high and accordingly is only attractive to employ them in relation to high security risk transactions or when the potential damage that may be suffered is high.

WO 03/063411 proposes a system which produces an SMS message containing a limited-duration, one-time password and sends it to a user's mobile terminal. A modified Subscriber Identification Module (SIM) is used to store an asymmetric key application and associated software. The user activates the program, enters a personal code to decrypt the user's private key which thus authorises the mobile terminal to decode the SMS using the user's private key. A problem with this system is that it relies on the distribution of specific hardware to the user. Further, as the keys are on the SIM, distribution is dependent on the telecommunications provider. Still further, the one-time password will not contain any data that indicates that it has been decoded by the user i.e.—the one-time password is independent of the user.

It would be desirable to provide a more convenient method of authenticating an action.

SUMMARY OF THE INVENTION

In one aspect, the invention provides an authentication method comprising requesting a user of a personal mobile terminal to enter a personal code into a personal mobile terminal in response to receipt of an authentication request transmitted to the personal mobile terminal, the authentication request being related to an action that requires user authentication, and processing an entered personal code together with challenge data corresponding to the authentication request to determine whether one or more predetermined conditions are met and, if one or more predetermined conditions are met, producing a valid and signed authentication code that the user can provide in order to authenticate the action.

In an embodiment, challenge data is transmitted to the personal mobile terminal as part of the authentication request.

In another embodiment, the method comprises generating, at the personal mobile terminal, challenge data corresponding to at least part of the authentication request.

In an embodiment, at least one of the one or more predetermined condition is that the personal code is correct.

In an embodiment, the method comprises processing the entered personal code together with at least one key stored on the mobile phone.

In this embodiment, at least one of said one or more predetermined conditions is that the key is correct.

In an embodiment, details of the action are included in the authentication request, and the method comprises displaying the details of the action to the user before the user enters the user's personal code.

In an embodiment the transaction details are only displayed after the personal code is entered.

In another aspect, the invention provides a computer program that when executed by a personal mobile terminal enables the personal mobile terminal to request a user of the mobile terminal to enter a personal code following receipt of an authentication request transmitted to the mobile terminal, the authentication request being related to an action that requires user authentication, process an entered personal code together with a challenge corresponding to the authentication request, and produce a valid and signed authentication code that the user can provide in order to authenticate the action if one or more predetermined conditions are met.

In one embodiment the computer program enables a personal mobile terminal to process challenge data transmitted to said personal mobile terminal as part of said authentication request.

In an embodiment the computer program generates, at said personal mobile terminal, challenge data corresponding to at least part of said authentication request.

In an embodiment the computer program is executed by the personal mobile terminal upon receipt of the authentication request.

In an embodiment the computer program causes the personal mobile terminal to automatically provide the authentication code on the user's behalf after completion of processing of the personal code.

In another embodiment, the invention provides a personal mobile terminal configured to request a user of the mobile terminal to enter a personal code following receipt of an authentication request transmitted to the mobile terminal, the authentication request being related to an action that requires user authentication, process an entered personal code together with challenge data corresponding to the action data to determine whether one or more predetermined conditions are met, and produce a valid and signed authentication code that the user can provide in order to authenticate the action if the one or more predetermined conditions are met.

In another aspect, the invention provides an authentication method comprising transmitting an authentication request to a personal mobile terminal designated as belonging to a user in response to the initiation of an action that requires authentication by the user, receiving the authentication request at the personal mobile terminal, prompting a user to enter a personal code into the personal mobile terminal, processing the personal code together with challenge data corresponding to the authentication request and if one or more predetermined conditions are met, producing a valid and signed authentication code that the user can provide in order to authenticate the action.

The action may be a transaction initiated by the user or requiring authorisation by the user.

In an embodiment, the transaction is a banking transaction.

In an embodiment the transaction is an order for a product or service.

In another aspect, the invention also provides a system for authenticating actions comprising an action authentication server, and one or more personal mobile terminals belonging to respective ones of one or more users of the system, the action authentication server being configured to transmit an authentication request to a personal mobile terminal of a user in response to initiation of an action requiring authentication by a user, each users' personal mobile terminal being configured to request the user of the personal mobile terminal to enter a personal code following receipt of the authentication request, process an entered personal code together with challenge data corresponding to the authentication request, and produce a valid and signed authentication code that the user can provide in order to authenticate the action if one or more predetermined conditions are met.

The action authentication server is typically configured to receive the authentication code and authenticate the action if the authentication code is valid.

The invention also extends to a method of configuring a personal mobile terminal to participate in an authentication system comprising providing an activation code to a user by a means independent of the user's personal mobile terminal, placing a security application on a web server for retrieval by the user's personal mobile terminal, providing details of the security application to the user that are sufficient for the user to retrieve the security application, running the security application on the user's personal mobile terminal in order to prompt the user for the activation code and to generate a confirmation code if the activation code is entered into the personal mobile terminal, and providing the confirmation code to the authentication system, and activating the user if the confirmation code is valid.

In an embodiment, the confirmation code is provided by a means independent of the user's personal mobile terminal.

In an embodiment, the user initiates a configuration of the user's personal mobile terminal by accessing the web server.

In an embodiment, the security application is personalised for said user.

DETAILED DESCRIPTION OF THE INVENTION

The preferred embodiment of the present invention provides a method of implementing a secure yet easy to use and deploy authentication method using personal mobile terminals such as mobile telephones. In the preferred embodiment the implementation is restricted to software that eliminates the need to issue or reissue any hardware to the user. The personal mobile terminal can then be used to authenticate an action. For example, to authenticate the user to a suitably enabled system or to authorise a payment to a suitably enabled payment system. In the preferred embodiment, the system allows a user to authenticate an action by entering a personal code such as a personal identification number (PIN) into their mobile phone.

Figure 1:
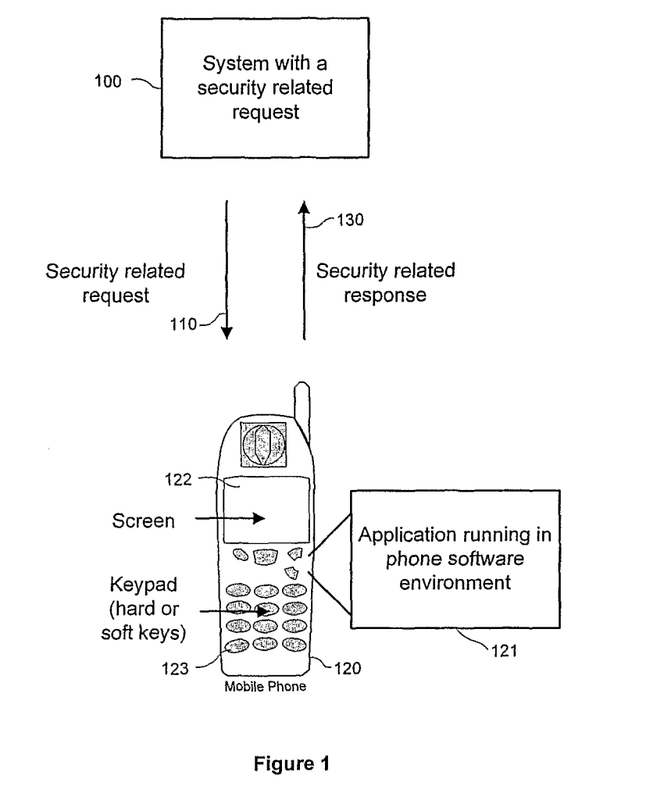
FIG. 1 is a schematic diagram giving an overview of how the system of the preferred embodiment operates.

Referring to FIG. 1, there is shown schematically the general operation of a method of the preferred embodiment. A system that needs to authenticate an action 100 transmits an authentication request 110 to a user's mobile phone 120. The mobile phone has been preconfigured with a security application that is run in software environment 121 of the mobile phone.

When the authentication request—e.g. a request to a transaction in an internet banking service—is received by the phone it is processed by the security application and a user is prompted to enter a PIN using keypad 123. If the PIN is correct, details of the request are displayed on screen 122. The PIN together with the authentication request are processed by the application 121 in order to generate a security related response 130 that can be supplied to the system with a security related 100 in order to authenticate the action.

Figure 2:
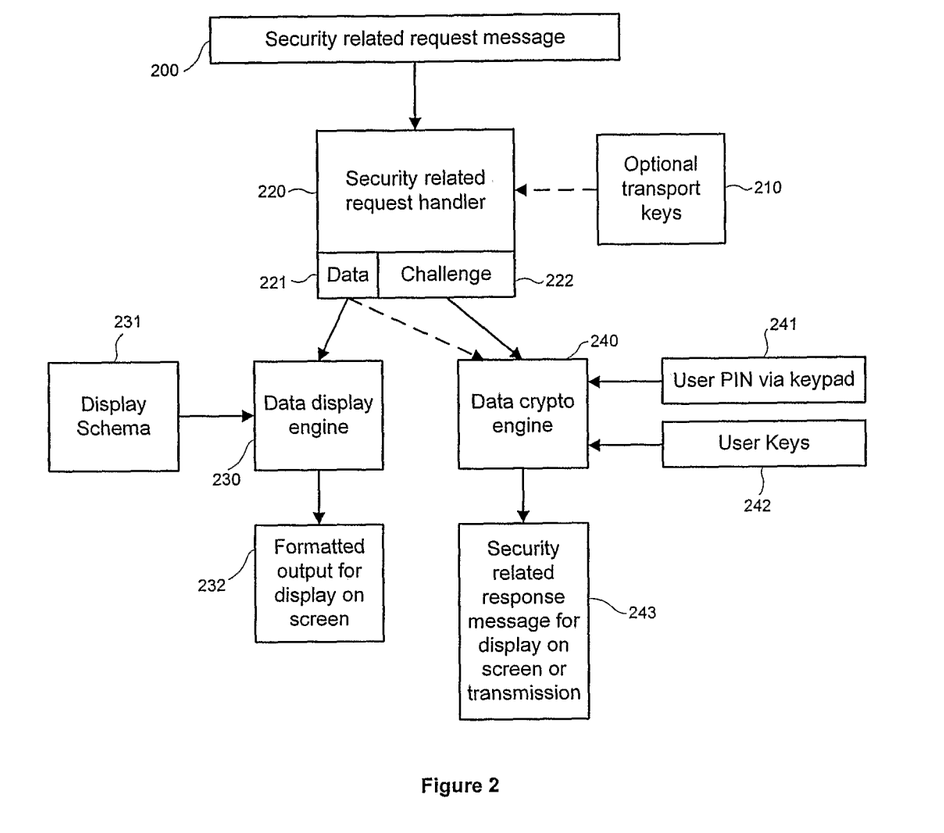
FIG. 2 is a schematic diagram illustrating how authentication request messages are handled by a computer program of the preferred embodiment operating on a personal mobile terminal.

The structure of the security application is shown schematically in FIG. 2. An authentication request 200 is received from the system that requires an action to be authenticated. The request 200 may be optionally encoded using transport keys 210 which are processed before further action is taken by the security related request handler 220. The request handler splits the authentication request into a data portion 221 and a challenge portion 222. The challenge portion includes an encoded portion related to the action, for example the transaction data encrypted with a public key assigned to the user.

The data portion 221 is processed by the data display engine 230 which uses preset display schema to format output for display on the screen 232. In the meantime, the data crypto engine 240 receives the input of the challenge 222, the user's identification number (PIN) 241 and a user's private key 242 stored in the memory of the personal mobile terminal and processes them to produce an authentication code that is displayed on the screen or transmitted back to the system at step 243. Persons skilled in the art will appreciate that any appropriate cryptographic algorithms such as 3DES or RSA can be used.

Figure 3:
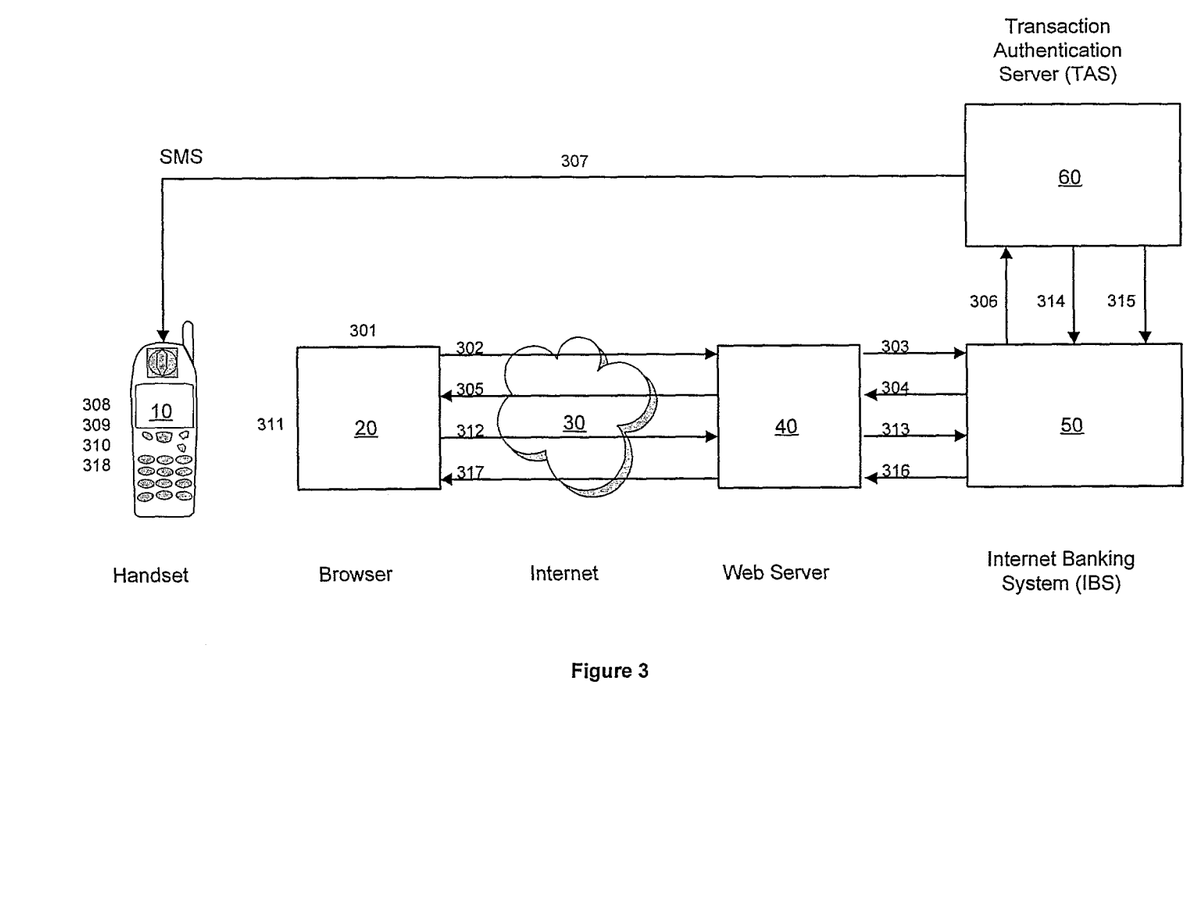
FIG. 3 is a process flow diagram of a transaction of the preferred embodiment.

A typical transaction process flow where the method of the preferred embodiment is used to authenticate transactions of an Internet banking system is illustrated in FIG. 3. In FIG. 3, components of the system are labelled by numbers on the components whereas the process flows are indicated by numbers beside the system components or beside the arrows between the system components.

In the first step of the process 301, the user operates their browser 20 typically running on a personal computer to log into their Internet banking website which is hosted by web server 40 by sending data over the Internet 30. Details of a proposed transaction are posted to the web server at step 302—e.g. a proposal to transfer $10,000. These details are then relayed to an Internet-banking system 50 at step 303. At step 304 the Internet banking system confirms that the transaction is allowed. At step 305 the web server serves a new page to the browser for the user to enter an authentication code that is to be generated by the user's mobile phone 10. At step 306, the Internet banking system 50 sends a transaction authentication request to transaction authentication server 60 which constructs an authentication request including a cryptographic hash of the details and sends the authentication as a short message service message (SMS) on a preset port number at step 307. At step 308 the SMS message launches the security application on the user's handset via the java community process standards JSR-118 MIDP-2.0 Push Registry implementation. The security application is a Java 2 Micro Edition (J2ME) java application that has been registered to listen on the preset port. At step 309 the user gives permission to run the security application and is prompted to enter their user PIN and the transaction details are displayed to them. At step 310 the security application then digitally signs the cryptographic hash using the PIN code and a private key stored on the personal mobile terminal to produce a unique numeric code that functions as an authentication code. As the code is using the user's private key, the authentication code can only be provided by someone having access to a personal mobile terminal having the user's software application and the user's PIN. At step 311 the user then having satisfied themselves that the transaction details displayed on the handset are correct enters the authentication code into the entry box on the webpage and submits the funds transfer request. The numeric code is sent at step 312 to the web server and relayed at step 313 to the Internet banking system. At step 314 it is passed to the transaction authentication server which is asked to validate the authentication code. The authentication server 60 replies at step 315 to indicate that the authentication code is correct. A funds transfer confirmation message is sent to the web server at step 316 and then passed to the browser at step 317. At step 318 the security application automatically exits 60 seconds after displaying the authentication code.

Persons skilled in the art will appreciate that a number of minor variations can be made to the system for example, the transaction details need only be displayed in this embodiment to the user after they have entered their PIN as the user will know whether they have initiated a transaction and to confirm the transaction requires the further step of entering the authentication code into their browser before the transaction is final. However in embodiments where the message is transmitted automatically to an authentication server by the personal mobile terminal (e.g. by return SMS message), it would be advantageous for the user to approve the transaction details before entering the PIN and accordingly for them to be displayed to the user before the user enters their PIN.

Persons skilled in the art will appreciate that there are a number of advantages of the above method. For example, the expense of issuing or reissuing hardware is avoided. The user's existing compatible mobile phone may be used, provided it can run appropriate software applications. Further, the authentication code is specific to the user as it is generated using the user's private key—i.e. the authentication code is "signed".

In the preferred embodiment the incoming security request efficiently and automatically launches the application thus making it easy for the user to use. It carries a challenge e.g. a random number to input into the cryptographic algorithm and it may carry a description of the service the user is to be authenticate to or the details of the payment to be authorised—generally, the details of the action which requires authentication.

The use of cryptographic algorithms such as 3DES and RSA ensure a high level of security. Additionally the personal nature of a mobile phone or similar device ensures that it is close to the user and its loss will be noted promptly unlike a security token. Because the software can be deployed readily over the air as will be described in further detail below, deployment costs are minimised. The software can also be deployed using infrared, Bluetooth or phone data cables.

Persons skilled in the art will appreciate that the technique of the preferred embodiment can either be deployed as standard authentication technique and licensed to a number of different parties or slightly different variations can be used for authorising different transactions. In this respect it will be appreciated that a number of similar but slightly different cryptographic processes can be applied using different keys in order to authenticate different services using the one mobile phone.

Persons skilled in the art will appreciate that the method may be used to authenticate a number of different actions including:

Authenticating any service offered via Internet and accessed by a personal computer. For example logging onto a government website to update sensitive personal details.

Authorisation of phone orders.

Authentication of network devices for services. For example authorising a wireless network connection for a personal computer.

A typical personal mobile terminal that will allow the system to operate is a mobile phone that supports a mobile information device profile (MIDP-2.0) as specified in the java community process standard JSR118, connected limited device configuration (CLDC-1.0) as specified in java community process standard JSR30 and wireless messaging API (WMA 1.1), as specified in java community process standards JSR 120. An exemplary phone that complies with these standards is a Nokia 6230. The application is written in J2ME-JSR68 and the security related message can be a GSM SMS message as described by the ETSI organisation in GSM 03.40 and GSM 03.38.

The SMS message is encoded in Protocol Description Unit (PDU) mode, in which a destination port number can be assigned in addition to the destination mobile phone number so that the application can be registered on a specific port number.

Figure 4:
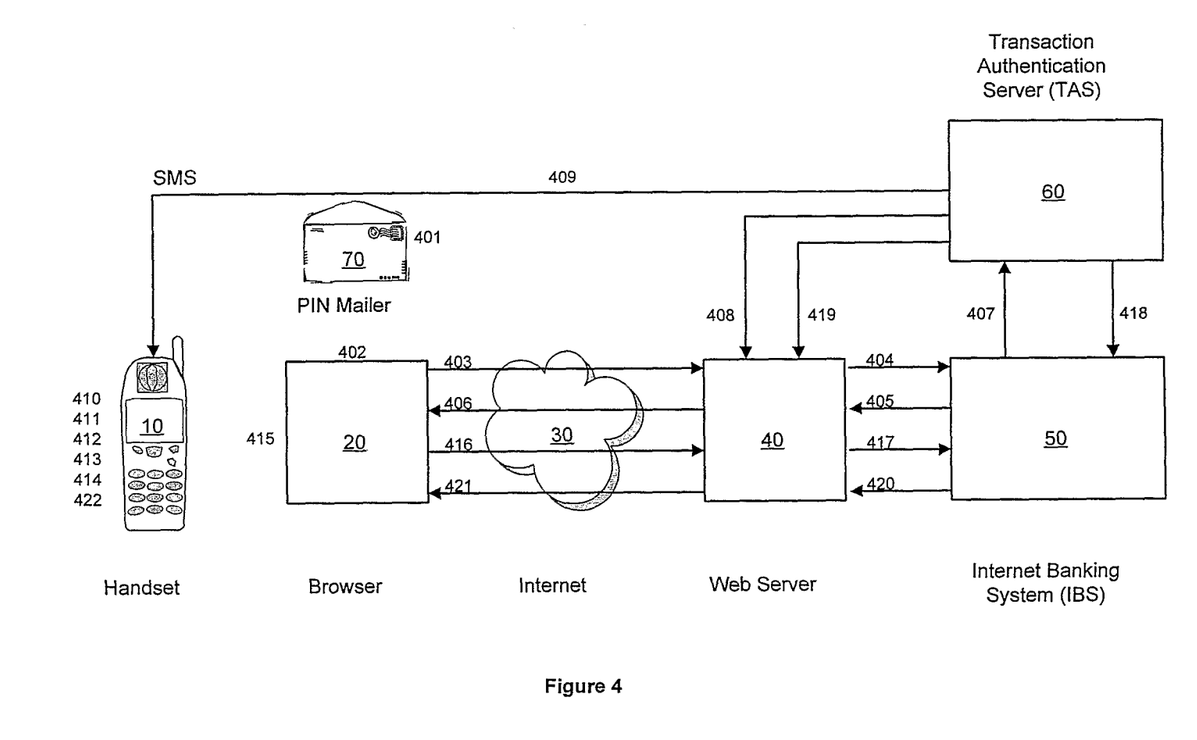
FIG. 4 is a process flow diagram of a provisioning technique of a preferred embodiment.

A preferred embodiment for configuring a user's mobile phone so that they can utilise the above method to authenticate an action will now be described in relation to FIG. 4. Referring to FIG. 4, registration is initiated by a user who wishes to take advantage of this system by registering their mobile phone number with the institute with which they wish to use the authentication technique, in this example a bank. At step 401 the user is sent an initial activation code using a technique such as a personal identification number mailer 70 so that the activation is sent to an address that is already registered with the bank so that the bank can have a high degree of surety that the PIN has been sent to the correct person. At step 402 the user uses their browser 20 to log into their Internet banking system 50 via web server 40 over Internet 30. The user then starts the application provisioning process by pressing an appropriate button on the web page. The user's request to start the provisioning process is posted to the web server 40 at step 403. The request is then relayed to the Internet banking system 50 at step 404.

The Internet banking system confirms that provisioning is allowed at step 405 and at step 406 the web server serves a new page to the user's browser 20. The new page contains an entry box for the user to enter a confirmation code that will be generated by the user's handset later in the provisioning process. The Internet banking system 50 sends a provisioning request to the transaction authentication server 60 at step 407. At step 408 the transaction authentication server 60 places a user application customised to the user with appropriate keys on the web server 40 for retrieval by the user's personal mobile phone 10. At step 409 the transaction authentication server 60 also sends a WAP Push service message to the user's personal mobile phone 10 with the name of the application and a web address. At step 410 the user gives permission to their handset to retrieve the application over the air (OTA) using Wireless Application Protocol (WAP) at step 410.

At step 411 the handset retrieves the application over WAP, and registers the application with the Push Registry for the preset port number. At step 412 the user gives permission to run the application. At step 413 the application prompts for the activation code and the user enters the activation code that they received from PIN mailer 70 at step 401. The user is then prompted to select and confirm their own personal identification number (PIN) for all future use. The application cryptographically calculates a unique confirmation code based on the initial activation code and the user's keys and it is displayed to the user at step 414. At step 415 the user enters the confirmation code into the web page and submits the details to the web server 40 at step 416. At step 417 the confirmation code is relayed to the Internet banking system 50. The Internet banking then sends the message to transaction authentication server 60 at step 418 and asks that the user state be set to "provisioned" provided the confirmation code is verified as correct. At step 419 the transaction authentication server asks that the user application be deleted from the web server. At step 420 the Internet banking service notes that the user has been successfully provisioned and that their application is functioning correctly on their handset and sends and accepted message to the web server. The web server presents a "You are now operational" message to the user at step 421 and at step 422 the application exits are, typically 60 seconds after displaying the unique confirmation code.

Persons skilled in the art will appreciate that alternative environments may be used to implement the preferred embodiment. For example, the application could be a .Net security application running in the Windows Mobile 2003 Second Edition for Smart phones environment.

There are a number of specific variations to the above embodiment which can be employed while still obtaining some or all of the benefits of the above embodiment. In one embodiment, rather than the challenge data being contained within the security related request message 200, the challenge can be generated at the personal mobile terminal from the transaction data sent to the mobile terminal. That is, generated at a handset rather than the server. (This transaction data can still be encrypted with transport keys between the server and handset.)

Persons skilled in the art will appreciate that the term "challenge data" is used herein to refer to the actual challenge data that is processed. In this embodiment, the authentication request will still include a "challenge portion" in the sense that at least a portion of the data in the authentication request is intended to be used to form challenge data. The difference in this embodiment is that instead of the challenge data being a separate part of the authentication request that is not displayed (i.e. which was solely for input to the data-crypto engine), data relating to the actual transaction is used as the basis for the challenge data. This ties the data displayed to the user to the generated authentication code (in addition to the user's keys coupling the authorisation to the user).

The display of data to the user means the user knows precisely what they are authorising/signing. If the other channel is compromised (e.g. a man in the middle attack between the Internet Browser and the Internet Server modifies the amount or account number), the user will see and catch this on the handset display allowing intervention. A system whereby only encrypted passwords are transmitted/generated does not protect against this type of attack.

The action data is typically displayed to the user and then hashed, for example, using SHA-1. A "sequence" number is stored on the personal mobile terminal. The sequence number is added to the data before the hashing function is performed and the sequence number is incremented after each authentication code generation on the handset. At the server end, the last matched sequence number is stored for each handset. When attempting to verify an authentication code, the sequence number is incremented (within a preset limit) until a match is found. It will thus be appreciated that as in the above embodiment, the authentication code is in effect signed by the user as it is personalised to the user. The sequence number is a convenient method of preventing playback attack. A set of challenge/responses will only be verified once as the server will only accepted authentication codes that validate with the current or greater sequence number.

It will also be appreciated by persons skilled in the art that the person who authorises the transaction does not have to be the person who initiated the action. For example, a company could arrange their affairs such that all requests for transfers of funds above a certain dollar value have to be approved by Chief Financial Officer. They can achieve this without needing the Chief Financial Officer (CFO) to be in the office. For example, an administrative officer can initiate the transaction request which will result in the system sending a message to the personal mobile terminal of the CFO providing payment summary details. The CFO can then authorise the payment. This can be returned automatically via SMS.

Persons skilled in the art will also appreciate that it would be possible to enforce multiple authorisations before a request is executed utilising the system of the preferred embodiment. For example, two approvals may be required to transfer funds above certain balances. These may need to be received sequentially—i.e. a first approval is received prior to the second authentication request being sent—or in parallel—i.e. requests are sent contemporaneously to two parties.

Further, rather then using the PIN mailer 70 as indicated in FIG. 4, the activation code could be returned to the user electronically (e.g. displayed in their browser when they start the provisioning process). A further security element that could be incorporated is to implement a time out on the server side, for example five minutes after the request SMS is sent. This is particularly useful in the embodiments where the user is expecting the authentication request and reduces the exposure to risk, for example, if they have mislaid their mobile terminal.

Persons skilled in the art will appreciate that further security measures may be incorporated. For example, mobile terminal specific data, where available, may be incorporated into the confirmation code and all authentication codes. This helps protect against application cloning—i.e. where someone copies the application code and memory from the mobile terminal and runs it on a different mobile terminal type or emulator. Unless they collect or know the mobile terminal specific data, the activation code generated by the different mobile terminal or emulator will be incorrect.

Persons skilled in the art will appreciate that in specific embodiments the authentication code can be provided in a number of other ways. For example, if the authentication code is used to authenticate a transaction over the phone, the authentication code can be read out by the user or entered into a telephone key pad (either of the user's mobile terminal or another telephone). In order to assist disabled users, it would also be possible to modify the computer program to incorporate a speech synthesis sub-routine so that following entry of the user's PIN, the personal mobile terminal could "read out" the authentication code on the user's behalf either automatically or after it is instructed to do so.

Persons skilled in the art will appreciate that various other modifications may be made to the above invention without departing from the scope and spirit of the inventions described herein.

The invention claimed is:

1. An authentication method comprising:
   requesting a user of a personal mobile terminal to enter a personal code into the personal mobile terminal in response to receipt of an authentication request transmitted to the personal mobile terminal, the authentication request including transaction data of an action that requires user authentication;
   displaying the transaction data on a display of the personal mobile terminal to enable the user to apprehend that the authentication request validly relates to transaction details of the action; and
   processing an entered personal code together with challenge data derived from the transaction data contained in the authentication request to determine whether one or more predetermined conditions are met and, if one or more predetermined conditions are met including that the personal code is correct, producing a valid and signed authentication code from the challenge data that the user can provide in order to authenticate the action;
   whereby the transaction data which is displayed on the display of the mobile terminal is tied to said valid and signed authentication code and the authentication code is also tied to the user through entry of the correct personal code.

2. An authentication method as claimed in claim 1, comprising transmitting challenge data to said personal mobile terminal as part of said authentication request.

3. An authentication method as claimed in claim 1, comprising generating, at said personal mobile terminal, challenge data corresponding to at least part of said authentication request.

4. An authentication method as claimed in claim 1, comprising also processing the entered personal code together with at least one key stored on the mobile phone.

5. An authentication method as claimed in claim 4, wherein at least one of said one or more predetermined conditions is that the key is correct.

6. An authentication method as claimed in claim 1, wherein the transaction data is only displayed after the personal code is entered.

7. An authentication method as claimed in claim 1, further comprising:
   transmitting the authentication request to a personal mobile terminal designated as belonging to a user in response to the initiation of an action that requires authentication by the user; and
   receiving the authentication code from the user;
   authenticating the action upon the authentication code being valid.

8. An authentication method as claimed in claim 7, wherein the action is a transaction initiated by the user.

9. An authentication method as claimed in claim 8, wherein the transaction is a banking transaction.

10. An authentication method as claimed in claim 8, wherein the transaction is an order for a product or service.

11. An authentication method as claimed in claim 7, wherein the action is a transaction initiated by an entity whose actions require authorization by said user.

12. A method as claimed in claim 1, further comprising configuring a personal mobile terminal by:
   providing an activation code to a user by a means independent of the user's personal mobile terminal;
   placing a security application on a web server for retrieval by the user's personal mobile terminal;
   providing details of the security application to the user that are sufficient for the user to retrieve the security application;
   running the security application on the user's personal mobile terminal in order to prompt the user for the activation code and to generate a confirmation code if the activation code is entered into the personal mobile terminal; and
   providing the confirmation code to the authentication system; and
   activating the user if the confirmation code is valid.

13. A method as claimed in claim 12, wherein the confirmation code is provided by a means independent of the user's personal mobile terminal.

14. A method as claimed in claim 12, wherein the user initiates a configuration of the user's personal mobile terminal by accessing the web server.

15. A method as claimed in claim 12, wherein the security application is personalized for said user.

16. A method as claimed in claim 1, comprising displaying the transaction data to the user prior to the user entering the personal code.

17. A method as claimed in claim 16, comprising automatically transmitting the authentication code after it is produced.

18. A method as claimed in claim 1, further comprising displaying transaction details corresponding to the transaction data on a display independent of the mobile terminal display.

19. A method as claimed in claim 1, wherein the challenge data comprises a cryptographic hash of the transaction data.

20. A method as claimed in claim 19, comprising signing the cryptographic hash with a private key stored on the mobile terminal to produce the authentication code.

21. A computer program stored on a web server for downloading to a mobile terminal, that, when executed by a personal mobile terminal, enables the personal mobile terminal to:
   request a user of the mobile terminal to enter a personal code following receipt of an authentication request transmitted to the mobile terminal, the authentication request including transaction data of an action that requires user authentication;
   display the transaction data on a display of the personal mobile terminal to enable the user to apprehend that the authentication request validly relates to transaction details of the action;

process an entered personal code together with challenge data derived from the transaction data contained in the authentication request; and produce a valid and signed authentication code from the challenge data that the user can provide in order to authenticate the action if one or more predetermined conditions are met, including that the personal code is correct;

whereby the transaction data which is displayed on the display of the mobile terminal is tied to said valid and signed authentication code and the authentication code is also tied to the user through entry of the correct personal code.

22. A computer program stored on a web server as claimed in claim 21, that enables a personal mobile terminal to process challenge data transmitted to said personal mobile terminal as part of said authentication request.

23. A computer program stored on a web server as claimed in claim 21, wherein said computer program generates, at said personal mobile terminal, challenge data corresponding to at least part of said authentication request.

24. A computer program stored on a web server as claimed in claim 21, wherein the computer program enables the personal mobile terminal to process the entered personal code together with at least one key stored on the mobile phone.

25. A computer program stored on a web server as claimed in claim 24, wherein at least one of said one or more predetermined conditions is that the key is correct.

26. A computer program stored on a web server as claimed in claim 21, wherein the transaction data is only displayed after the personal code is entered.

27. A computer program stored on a web server as claimed in claim 21, wherein the computer program is arranged to be automatically executed by the personal mobile terminal upon receipt of the authentication request.

28. A computer program stored on a web server as claimed in claim 21, that causes the personal mobile terminal to automatically provide the authentication code on the user's behalf after completion of processing of the personal code.

29. A computer program as claimed in claim 21, wherein the challenge data comprises a cryptographic hash of the transaction data.

30. A computer program as claimed in claim 29, comprising signing the cryptographic hash with a private key stored on the mobile terminal to produce the authentication code.

31. A personal mobile terminal comprising:

a request handler arranged to request a user of the mobile terminal to enter a personal code following receipt of an authentication request transmitted to the mobile terminal, the authentication request including transaction data of an action that requires user authentication;

a data display engine arranged to display the transaction data on a display of the personal mobile terminal to enable the user to apprehend that the authentication request validly relates to transaction details of the action; and a data crypto engine arranged to process an entered personal code together with challenge data derived from the transaction data contained in the authentication request to determine whether one or more predetermined conditions are met, including that the personal code is correct, and produce a valid and signed authentication code from the challenge data that the user can provide in order to authenticate the action if the one or more predetermined conditions are met;

whereby the transaction data which is displayed on the display of the mobile terminal is tied to said valid and signed authentication code and the authentication code is also tied to the user through entry of the correct personal code.

32. A personal mobile terminal as claimed in claim 31, wherein the challenge data comprises a cryptographic hash of the transaction data.

33. A personal mobile terminal as claimed in claim 32, comprising signing the cryptographic hash with a private key stored on the mobile terminal to produce the authentication code.

34. A system for authenticating actions comprising:

an action authentication server; and one or more personal mobile terminals belonging to respective ones of one or more users of the system, the action authentication server being configured to transmit an authentication request to a personal mobile terminal of a user in response to initiation of an action requiring authentication by a user, the authentication request including transaction data of the action;

each users' personal mobile terminal being configured to:

request the user of the personal mobile terminal to enter a personal code following receipt of the authentication request;

display the transaction data on a display of the personal mobile terminal to enable the user to apprehend that the authentication request validly relates to transaction details of the action;

process an entered personal code together with challenge data derived from the transaction data contained in the authentication request corresponding to the authentication request; and produce a valid and signed authentication code from the challenge data that the user can provide in order to authenticate the action if one or more predetermined conditions are met, including that the personal code is correct;

whereby the transaction data which is displayed on the display of the mobile terminal is tied to said valid and signed authentication code and the authentication code is also tied to the user through entry of the correct personal code.

35. A system as claimed in claim 34, wherein the action authentication server is configured to receive the authentication code and authenticate the action if the authentication code is valid.

36. A system for authenticating actions as claimed in claim 34, wherein the challenge data comprises a cryptographic hash of the transaction data.

37. A system for authenticating actions as claimed in claim 36, comprising signing the cryptographic hash with a private key stored on the mobile terminal to produce the authentication code.

* * * * *